United States Patent [19]
Hirose et al.

[11] Patent Number: 5,921,018
[45] Date of Patent: Jul. 13, 1999

[54] DEVICE AND METHOD FOR LURING TERMITES

[75] Inventors: Hironobu Hirose, Kagoshima; Takaaki Ito, Nishinomiya, both of Japan

[73] Assignee: Sumitomo Chemical Company, Limited, Osaka-fu, Japan

[21] Appl. No.: 08/827,462

[22] Filed: Mar. 28, 1997

[30] Foreign Application Priority Data

Mar. 29, 1996 [JP] Japan ................................. 8-076034

[51] Int. Cl.⁶ ........................... A01M 17/00; A01M 1/20
[52] U.S. Cl. ............................. 43/132.1; 43/131
[58] Field of Search ............................. 43/107, 121, 131, 43/132.1, 133; 206/204, 525; 217/4; 220/1.5, 2, 3.3, 3.4, 484, 565, 676; 47/59, 62 R, 62 N, 62 E, 62 C, 62 A

[56] References Cited

U.S. PATENT DOCUMENTS

| | | |
|---|---|---|
| 31,514 | 2/1861 | Herdtfelder ........................... 220/484 |
| 148,331 | 3/1874 | Sleeman et al. . |
| 2,791,347 | 5/1957 | Boehm ................................. 220/484 |
| 4,315,381 | 2/1982 | Dvorin ...................................... 47/59 |
| 4,934,550 | 6/1990 | Cash ..................................... 220/484 |

FOREIGN PATENT DOCUMENTS

235225  1/1993  Taiwan .

*Primary Examiner*—Michael J. Carone
*Assistant Examiner*—James S. Bergin
*Attorney, Agent, or Firm*—Birch, Stewart, Kolasch & Birch, LLP

[57] ABSTRACT

A termite luring device comprising an open-topped container containing wood which termites attack. Drainpipe(s) are connected to the bottom of the container, and are formed with holes through which termites can pass. Also, disclosed herein is a method for capturing and killing termites using the termite luring device.

33 Claims, 8 Drawing Sheets

DEVICE AND METHOD FOR LURING TERMITES

BACKGROUND OF THE INVENTION

This invention relates to a device and a method for luring termites, a method of getting rid of termites, and a method of capturing termites.

Termites attack wooden buildings, deteriorating their strength and durability, thus occasionally causing unexpected dangers. Termite luring devices for monitoring are used to lure termites to estimate actual damage and plan a control program for preventing occurrence of damages.

Figure 9:
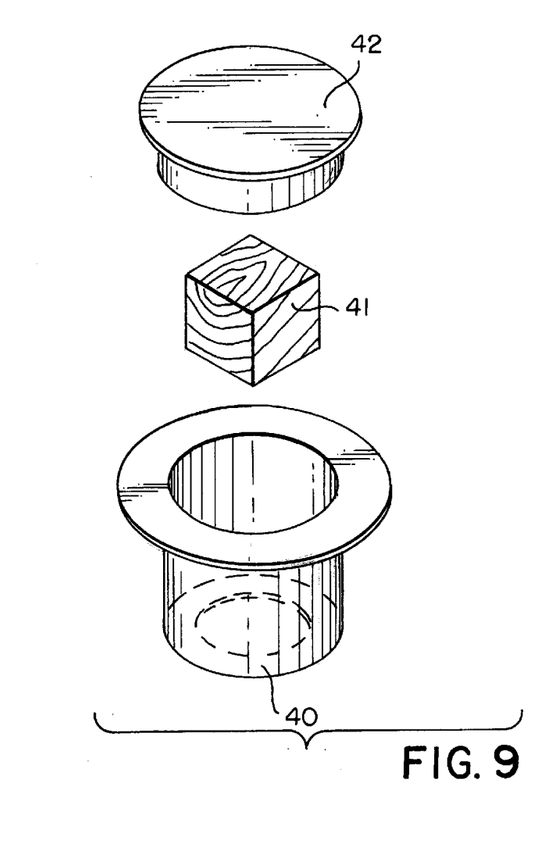
FIG. 9 is an exploded perspective view of a conventional termite luring device.

FIG. 9 shows such a device which comprises a cylindrical container 40 in which is placed wood 41. With its top opening closed with a detachable lid 42, the container 40 is buried and left in the ground for a certain period of time. In this state, the lid 42 is occasionally removed to observe if termites have been lured into the container 40, and how much the wood 41 has been attacked.

If the wood in the container is actually attacked, a termiticide is treated mainly in the area around the luring device to get rid of termites.

But this conventional device can lure only termites that are foraging within the distance of up to about 10 cm from the luring device. Thus, with this device, it is difficult to estimate actual damage by termites with high accuracy.

In many cases, location of termites' nests are undetectable. It is thus difficult to eradicate the whole group of termites simply by treating termiticides near the luring device. The surviving termites will thus continue to attack wooden buildings.

Also, it is not desirable to treat a large amount of termiticide without locating termites' nests, because any surviving termites may acquire resistance to termiticide.

An object of this invention is to provide a device for luring termites which can lure termites from a large area to reflect actual damage by termites with high accuracy, a method for effectively luring and killing termites using this device, and a method for capturing the whole group of termites using this device.

SUMMARY OF THE INVENTION

According to this invention, there is provided a device for luring termites comprising an open-topped container containing wood which termites attack, and drainpipe(s) connected to the bottom of the container, the drainpipe(s) being formed with holes through which termites can pass.

This device may further comprise a water-permeable or water-tight lid covering the top opening of the container. Wood may be put in each drainpipe.

Also, there is provided a method for luring termites comprising burying the drainpipe(s) of the above said device in the ground, and supplying water so as to be brought into contact with the wood in the container and permeate into the ground through the holes formed in the drainpipe(s). In the method for killing termites, a termiticide is given to termites lured into the container.

There is also provided a method for capturing termites comprising burying the drainpipe(s) of the above-described device in the ground, supplying water so as to be brought into contact with the wood in the container and permeate into the ground through the holes formed in the drainpipe(s) to lure termites into the container, connecting to the container a closed container containing wood in which termites can make a nest, and capturing termites in the closed container after the termites in the closed container have made a nest.

With the drainpipes of the device buried in the ground, rainwater, tap water or water containing termite attractants is supplied into the container through its top opening to bring it into contact with the wood. Water-soluble extracts in the wood thus dissolve into the water. The water is then distributed through the holes formed in the drainpipe(s) connected to the bottom of the container into the ground and spreads through a wide area in the ground.

When the water spreads in the ground, termites in the ground will detect the wood extracts contained in the water. Due to their habit of searching the source of the wood extracts, they are lured toward the holes formed in the drainpipe(s) and further into the drainpipe(s) through the holes and then toward the wood in the container.

The top opening of the container is preferably covered with a water-permeable lid to keep the container from being tampered with by kids and to prevent the entry of sand and other foreign matter but water.

The water-permeable lid may be a cover having at least one hole and made from metal, wood, synthetic resin, rubber, ceramic or any other known material, or may be formed of a porous member such as a sintered or expanded material, or may be partially made of cloth. The lid may be a dish member having through holes in its center and covering the top opening of the container with its concave side up.

Such a dish member preferably has a greater diameter than the top opening of the container so that it can collect rainwater effectively.

By providing wood in each drainpipe besides the wood in the container, it is possible to increase the concentration of wood extracts in the ground and thus to lure termites more effectively. If the drainpipes are made of a soft material, they may be deformed and their water permeability may be impaired under high ground pressure while they are buried in the ground. Such trouble is avoidable by inserting wood in the pipe(s).

By giving a termiticide to termites lured into the open-topped or closed container, they will die by coming into contact with or by taking the termiticide. By using a slow-acting chemical or poisonous bait, termites lured into the container can go back to their nest together with said poisonous bait. The chemical or poison brought into the nest can kill the entire group of termites living in the nest.

In the method in which termites are lured into a closed container containing wood and connected to the container of the device to capture them in the closed container, it is possible to capture the entire group of termites which make nests in the wood, such as Formosan subterranean termites, after they are lured into the closed container and make a nest in the wood bait.

Other features and objects of the present invention will become apparent from the following description made with reference to the accompanying drawings, in which:

DETAILED DESCRIPTION OF THE PREFERRED EMBODIMENT

The termite luring device embodying this invention includes a waterproof, open-topped, cylindrical or polygonal container which can store water and wood which termites prefer such as pine wood. To the bottom of the container are connected drainpipe(s) formed with holes.

Rainwater flows into the container through its top opening and then into the soil through the holes formed in the drainpipe(s). Since the water contains wood extracts, termites living in the wide area are lured into the container. Water may be artificially supplied into the container without depending on rainwater.

In order to lure termites more effectively, a solution containing termite attractants may be fed into the container through its top opening. Such termite attractants include camphor, thujene, linalol, cadinene, turpentine oil, borneol, methylanisole, cinnamyl alcohol and isosafrole.

To prevent clogging of the holes in the dish member, a filter member such as nonwoven fabric or artificial turf may be provided in the dish member.

The container which can store water or the closed container used in this invention has a volume of 300–500 $cm^3$, and may be made from polyvinyl chloride, polyethylene, polypropylene, polystyrene, biodegradable polymer, metal, concrete or the like.

Preferably, the drainpipe(s) connected to the bottom of the container are about 0.5–8 cm in inner diameter and about 0.5–4 meters long and connected together by a required number of joints. The drainpipe(s) may be made from vinyl chloride, any other resin or rubber, rust proof metal such as stainless steel, ceramic, concrete or wood. Drainpipes made of resin or rubber are preferable because they are flexible. The shape of the drainpipes is not limited. They may have a circular, oval, hourglass-shaped, semicircular or any other cross-section.

The holes formed in the drainpipe(s) have to be large enough to allow passage of termites. For example, they may be 2–50 mm diameter. The holes are formed in the peripheral surface and/or end faces of the pipe(s), spaced longitudinally at intervals of less than 200 cm. Also, a plurality of holes may be arranged in the circumferential direction of the pipes. They may also be arranged in a random fashion. Still further, small holes through which only water can pass (which may be pores of a porous material) may be formed in combination with larger holes through which termites can pass.

As described above, square pole-shaped or otherwise shaped wood may be inserted in the drainpipe(s) to more effectively lure termites into the container and simultaneously maintain high water drainage capacity of the pipes if the pipes are made of a soft material.

Chemicals which can be used to kill termites in this invention include organophosphorus compounds such as fenitrothion, fenthion, chlorpyrifos and chlorpyrifosmethyl; carbamate compounds such as BPMC, carbaryl, CPMC, isoprocarb, methomyl, MPMC and MTMC; Pyrethroidal compounds such as phenothrin, cyphenothrin, permethrin, cypermethrin, bifenthrin, rethmethrin, tralomethrin and decamethrin; boric acid; sulfulramide; chloronicotinyl compounds such as nitenpyram, acetaniprid and imidacloprid, and insect growth inhibiting substances containing slow-acting ant killing components such as diflubenzuron, teflubenzuron, triflumuron, chlorfluazuron, buprofezin, lufenuron, fenoxycarb, methoprene, pyriproxyfen, hydroprene, cyromazine and hexaflumuron. These termites exterminators may be provided in the form of poisonous baits.

When the baits are brought into a termites' nest by termites themselves, it is possible to kill the entire group of termites in the nest.

Embodiments of this invention are now described with reference to the accompanying drawings.

Figure 1:
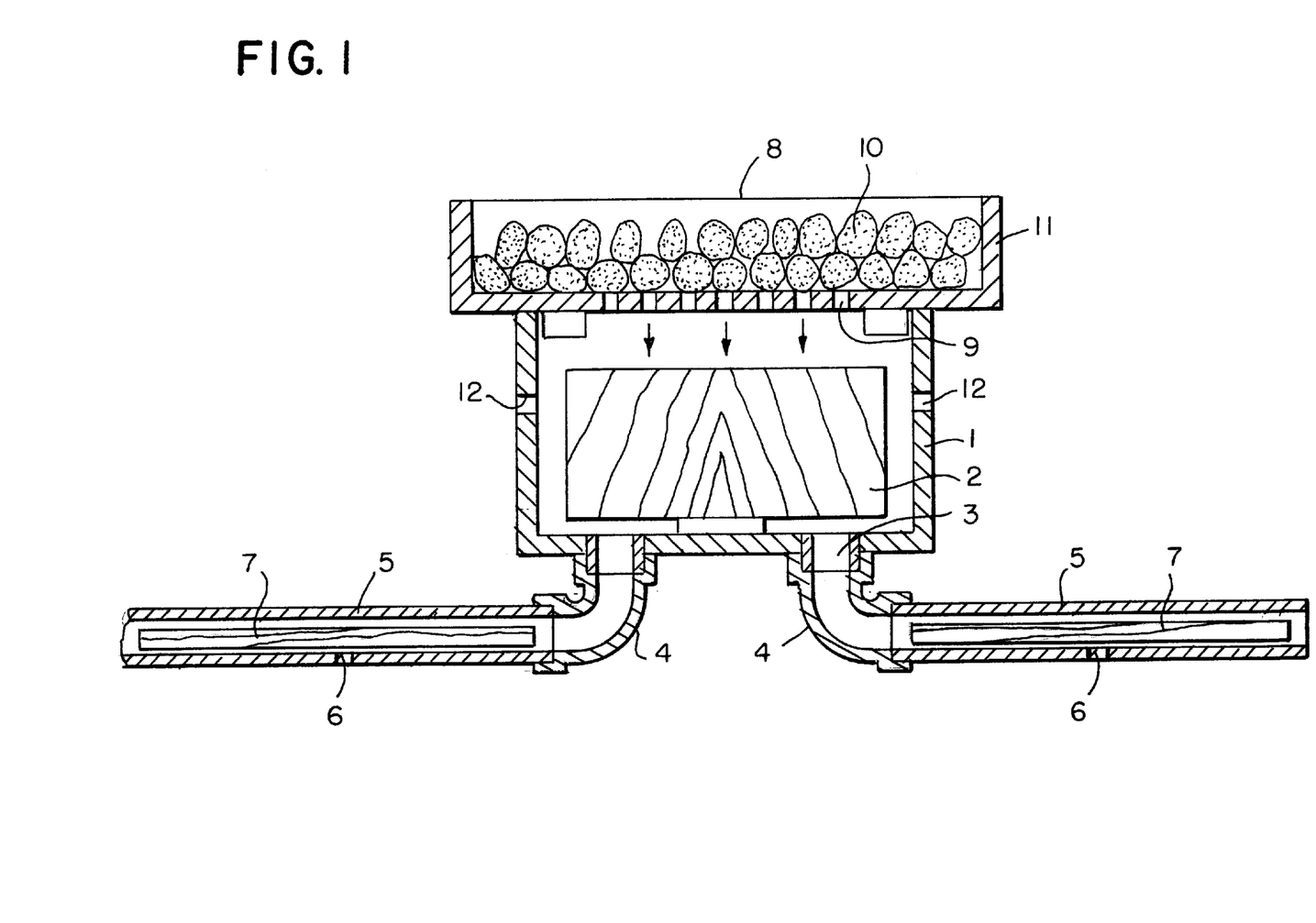
FIG. 1 is a sectional view of a termite luring device of a first embodiment.
Figure 2:
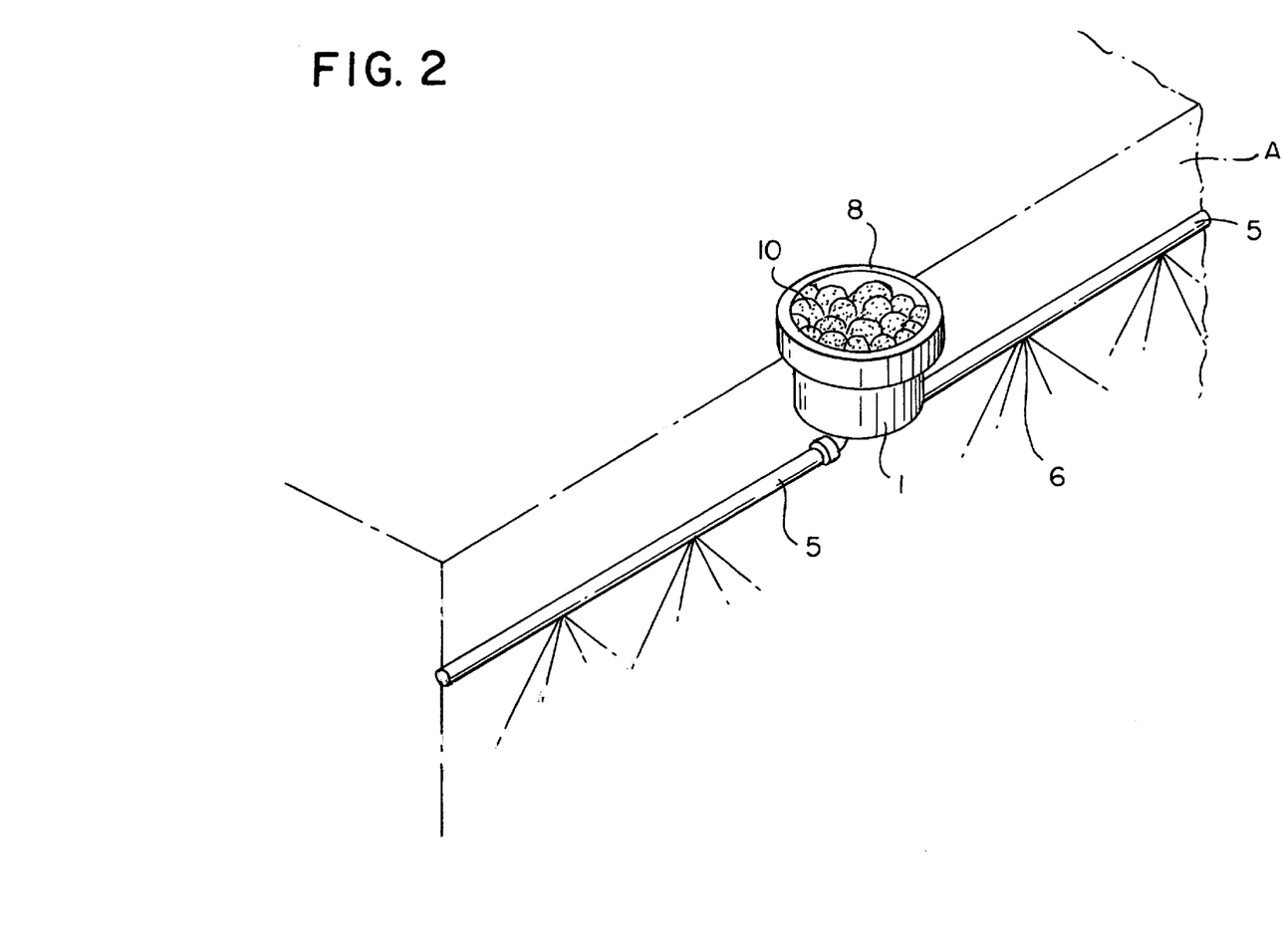
FIG. 2 is a perspective view of the device of the first embodiment in actual use.

FIGS. 1 and 2 show the first embodiment, in which wood 2 is placed in an open-topped, cylindrical plastic container 1. The container has drain holes 3 through which termites can enter the container and for water drainage. Drainpipes 5, 1 to 2 meter long, are connected to the holes 3 through joints 4. Each drainpipe 5 has holes 6, 2–5 mm in diameter, formed in its bottom at intervals of 20–30 cm. Square pole-shaped wood 7 are placed in the drainpipes 5.

A dish member 8 having a greater diameter than the top opening of the container 1 is put on the container with its recess facing up. The dish member 8 comprises a bottom having holes 9 through which water or liquid attractant is introduced into the container 1, a vertical peripheral wall 11 for collecting rainwater. A filtering member 10 made from nonwoven fabric is placed on the bottom of the dish member 8 to remove dust. The container 1 has a peripheral wall formed with holes 12 through which termites can crawl into the container.

In use, the drainpipes 5 are buried in the ground A with the top opening of the luring device above the ground, as shown in FIG. 2. The dish member 8 effectively collects rainwater which is used to extract the water-soluble components of the wood 2 in the container 1 and allow them to penetrate widely into the ground through the holes 6 in the drainpipes 5. The water containing the extracts of the wood lures termites into the container 1, making it possible to estimate or monitor the population of the termites with fairly high accuracy from the number of termites lured into the container 1. Termiticides may be given to the termites lured into the container to kill them.

If the luring device is buried in soil which is so humid that excess water tends to collect in the container, it is not necessary or even detrimental to supply rainwater further into the container, because such additional rainwater may rot the wood 2. Thus in such a case, the dish member 8 is removed and instead, the top opening is covered with a waterproof (water-tight) lid (not shown).

Figure 3:
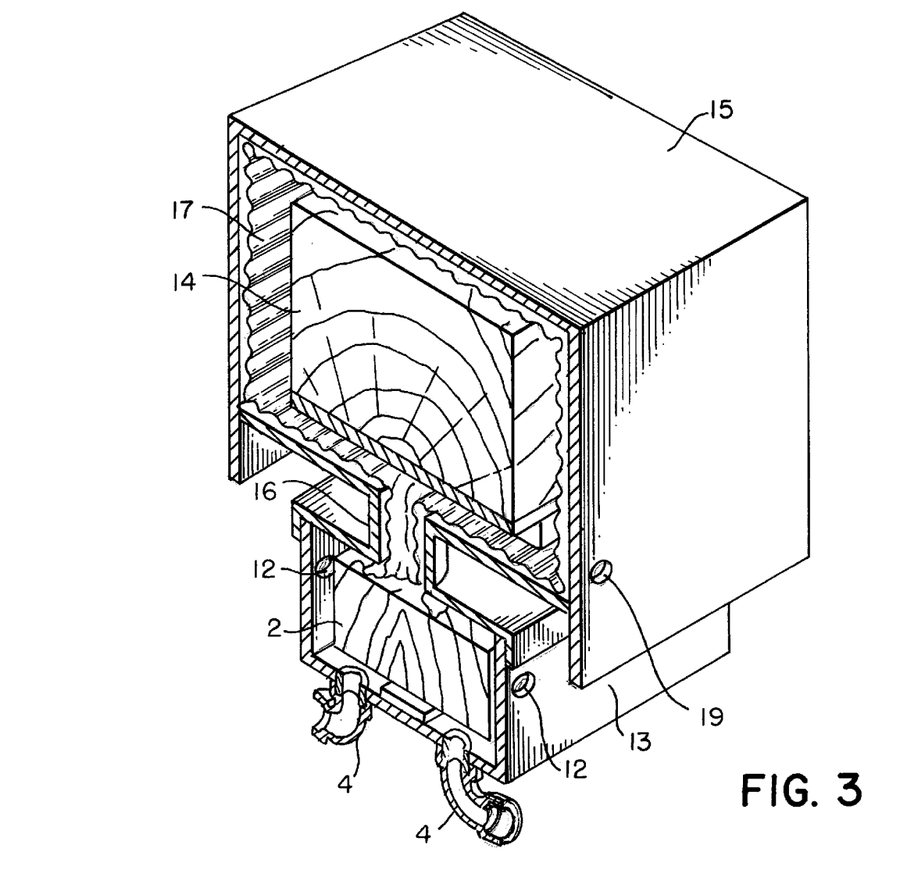
FIG. 3 is a partially cutaway perspective view of a termite luring device of a second embodiment and a closed container.
Figure 4A:
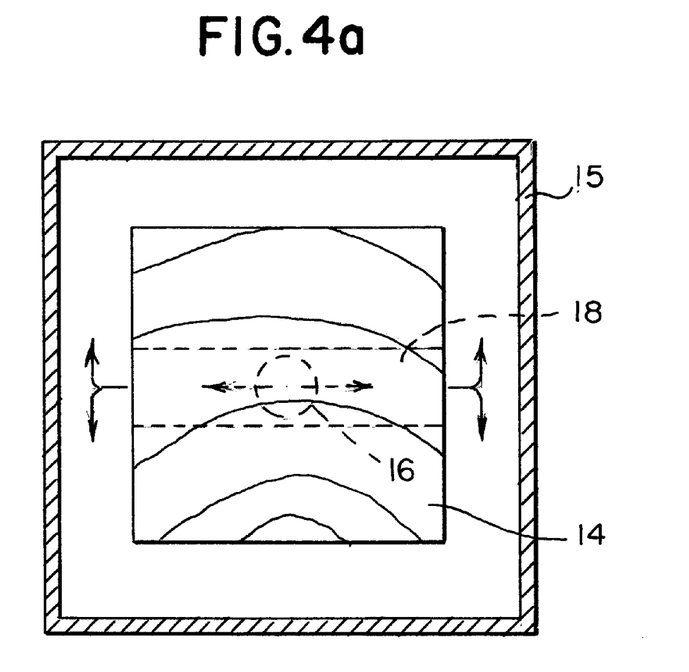
FIG. 4A is a cross-sectional view of the closed container of the second embodiment.
Figure 4B:
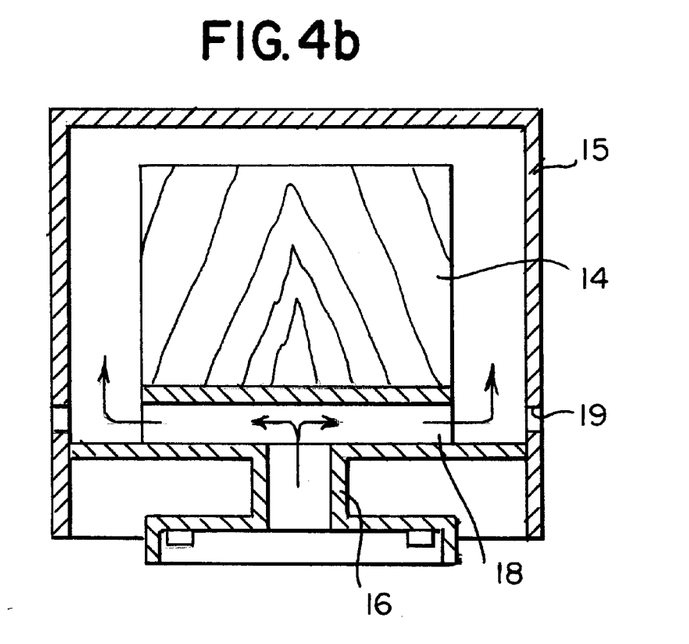
FIG. 4B is a vertical sectional view of the same.

FIGS. 3 and 4 show the second embodiment of the invention, which is a device for luring and killing termites. This device comprises a box-shaped container 13 having a top opening, and a closed container 15 connected to the container 13 through a cylindrical portion 16. A relatively large wood 14 such as pine tree is put in the container 15. The container 15 and the cylindrical portion 16 have their entire interior surfaces covered with a sheet of corrugated paper 17 so as to surround the wood 14 so that termites can easily move from the wood 2 onto the wood 14.

As shown in FIGS. 4A and 4B, a passage 18 through which termites move is formed in the container 15. Termiticides are supplied into the passage 18 through ports 19 formed in the side walls of the container 15.

While termites crawl from the wood 2 through the cylindrical portion 16 into the closed container 15 (as shown by arrows in the figures), they necessarily pass through the passage 18 into which a termiticide is treated on them through the ports 19. Termites can thus be killed by coming into contact with or by taking the termiticide.

Since the wood 14 in the closed container 15 is fairly massive, it is possible to capture a large number of termites. In the case of Formosan subterranean termites, it is even possible to capture the whole group by letting it stand until they make a nest in the wood 14 in the closed container 15. The captured termites are killed physically or chemically.

Figure 5:
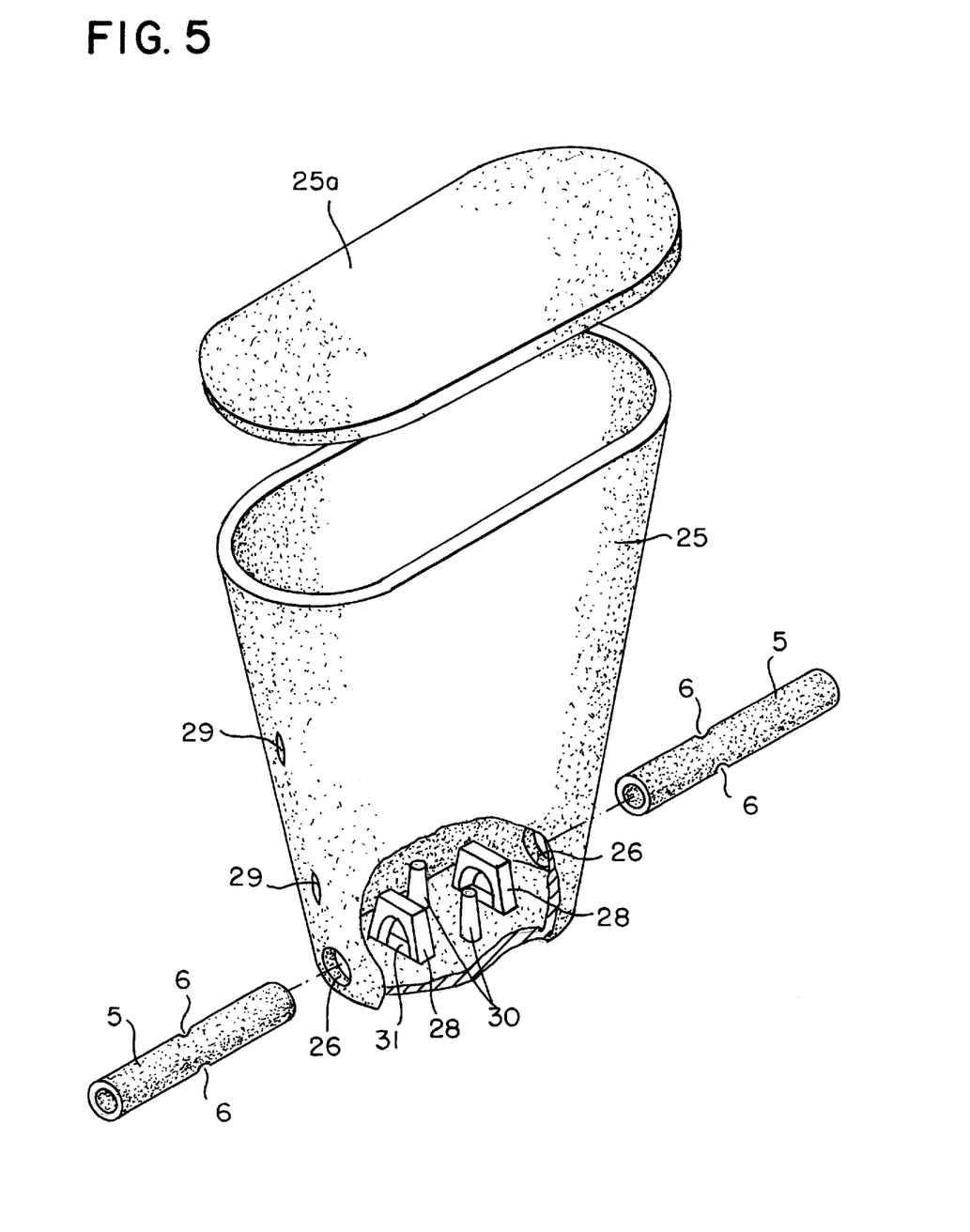
FIG. 5 is a partially cutaway perspective view of a termite luring device of a third embodiment.
Figure 6:
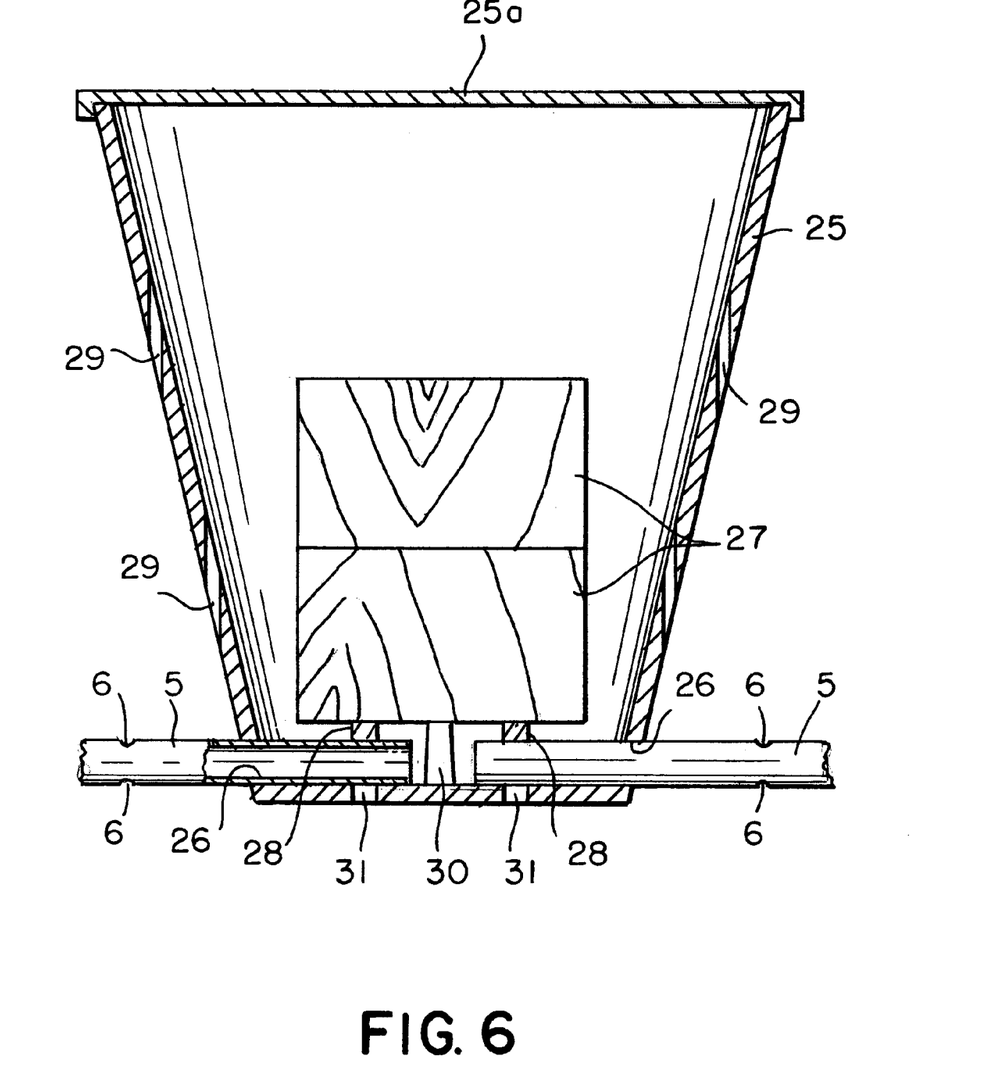
FIG. 6 is a sectional view of the same.

FIGS. 5 and 6 show the device of the third embodiment, which includes a truncated conical plastic container 25 with a water-tight lid 25a. Drainpipes 5 are inserted through holes 26 formed in the side wall of the container 25 until their ends engage in arch members 28 provided on the bottom of the container 25. The arch members 28 support wood 27. Also formed in the side wall of the container 25 are drain holes 29 through which termites can enter the container. Drain passages 30 are formed in the bottom of the container through which termites can crawl into the container. Holes 31 having the same function as the passages 30 are formed in the bottom of the container between the legs of each arch member 28 (FIG. 6).

The container 25 is placed in a groove dug in the ground together with pipes 5 with only its lid 25a exposed above the ground. The container 25 has an elliptical section, and the pipes 5 are connected to the container at the ends of the major axis of the ellipse. Thus, the groove formed in the ground to bury the container and the pipes needs not be so wide, so that this device can be easily buried in the ground. Each pipe 5 is preferably 3–5 meters long. Drain holes 6 through which termites can pass are formed in each pipe 5, spaced longitudinally at intervals of e.g. 25 cm.

Figure 7A:
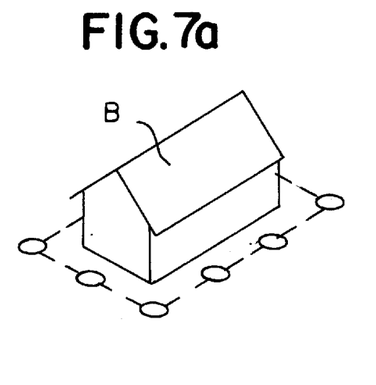
FIGS. 7A to 7G show how the drainpipes are connected together.
Figure 7B:
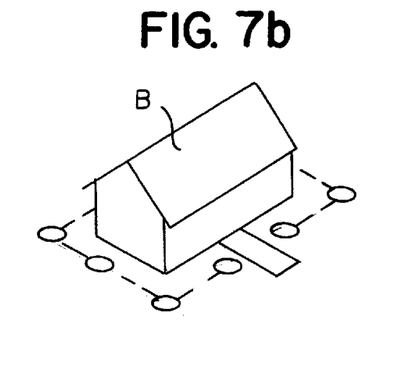

A plurality of such devices should preferably be arranged so that the pipes completely surround a building B, as shown in FIG. 7A. But if there is e.g. a concrete bed in the way as shown in FIG. 7B, the house B needs not be completely surrounded by pipes.

Figures 7C, 7D:
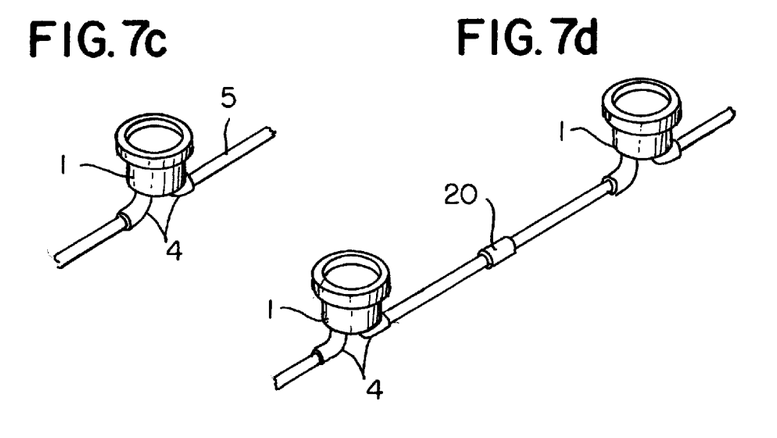
Figure 7E:
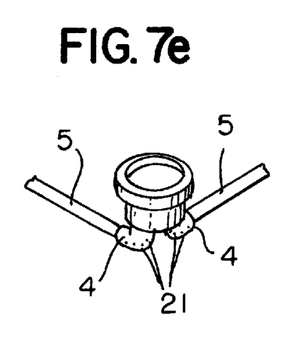
Figure 7F:
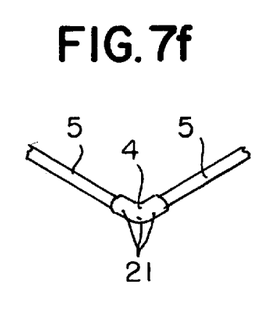
Figure 7G:
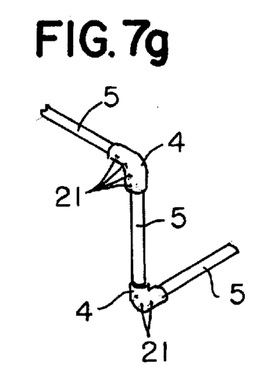

The pipes 5 may be ordinarily connected together in a horizontal position as shown in FIGS. 7C and 7D. But if there is a difference in level in the terrain around the house or if there is an area where the pipes cannot be laid, and if it is impossible to connect pipes at such a place even with the use of the pipes made from a flexible material such as soft plastics, they may be connected together by joints 4, 20 with the individual pipes bent horizontally or vertically relative to the adjacent pipes as shown in FIGS. 7E, 7F, and 7G. For smoother drainage, the joints 4, 20 may be formed with holes 21. These holes 21 may be large enough to allow passage of termites.

[EXAMPLES]

Figure 8A:
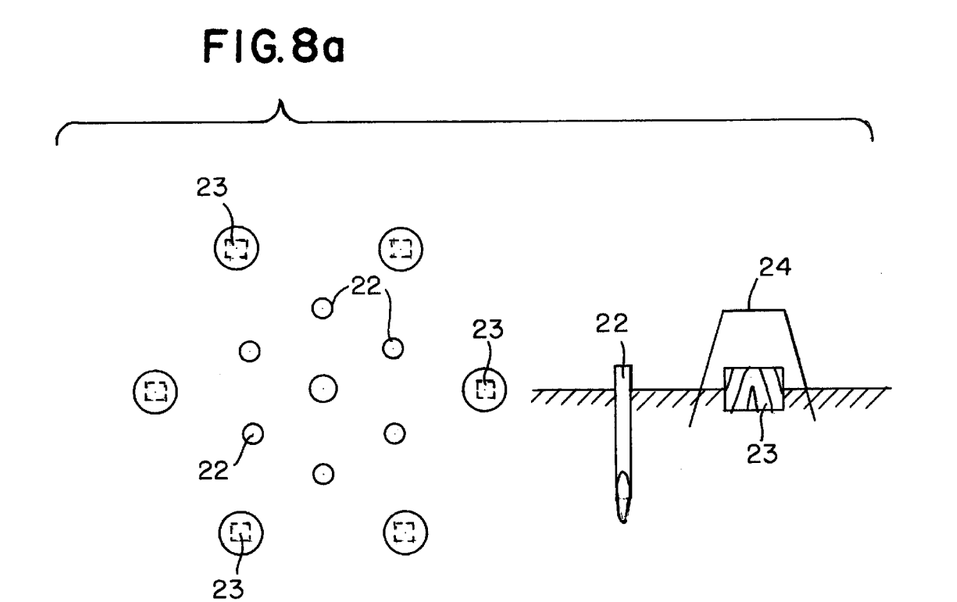
FIGS. 8A and 8B show how a test for the devices of the embodiments were conducted.

As shown in FIG. 8A, wood 22 in the form of pine stakes (30×30×500 mm) were driven into the ground around a termites' nest C. Pine timbers 23 (180×180×300 mm) were buried halfway in the ground at points farther from the nest and covered with a bucket 24 made of polyethylene and let to stand for one month.

Figure 8B:
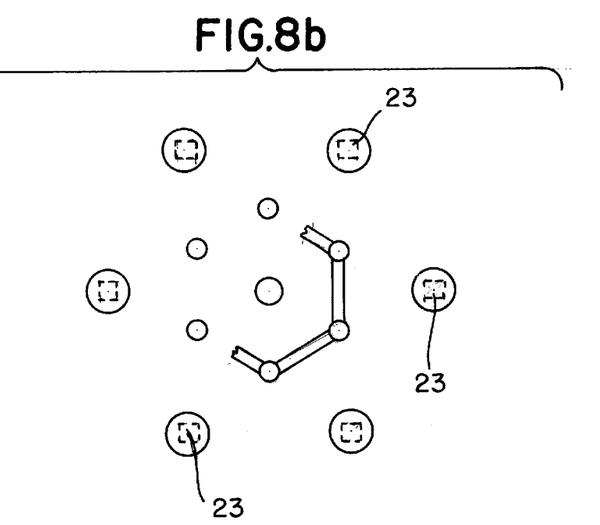

Luring devices of the type shown in FIG. 1 were set at points where termites attacked the timbers 23 but not the wood 22, i.e. points a, b and c shown in FIG. 8B. Pine pieces 0.3 m$^3$ in volume were immersed in 30 liters of water and let to stand for 24 hours, and 3 liters of solution in which were dissolved water-soluble extracts of the pine pieces were poured into each dish member 8 (see FIG. 1).

The devices were left in this state for about a month. After one month, all of the wood 2 (FIG. 1) were attacked, which clearly show that termites were lured into the devices.

A similar test was conducted for 10 wooden houses (40–50 years old) using luring devices of the third embodiment shown in FIGS. 5 and 6 and wood in the form of pine stakes (30×30×500 mm).

The container of each luring device used in this test measured 120 mm in major axis at its large-diameter portion (at the top opening), 65 mm in major axis at its small-diameter portion (bottom), 120 mm in height and 36 mm in width. It was made from plastics. The drain pipes having an inner diameter of 6 mm are formed with holes 3 mm in diameter at intervals of 25 cm.

Five of the 10 houses were of similar shapes with a perimeter of 45 meters. Ten to 12 luring devices were provided around each of the five houses at intervals of 4 meters as shown in FIG. 7A or 7B and buried in the ground with only the lids exposed above the ground. The containers were connected together by the drain pipes.

Two rectangular pine wood blocks (30 mm×30 mm×50 mm) were put in each container and one liter of 50 ppm solution of pine oil for attracting termites were further poured into each container.

As a blank test, wood in the form of stakes were arranged at 4 meter intervals in the same manner as the above luring devices around each of the remaining five houses, which are of similar shapes to the first five houses with a perimeter of about 45 meters.

This test was conducted continuously for about two months from summer (mid-August) to fall (early October). After the test, each wood was checked to see if it was attacked by termites.

For the luring devices of the third embodiment, it was found out that the wood in one of the containers for each of four of the five houses provided with the device according to the third embodiment was attacked, which indicates that termites inhabited these four houses.

For the remaining five houses for a blank test, none of the pine stakes were found attacked in spite of the fact that one of these five houses was actually under attack of termites. Thus, it is apparent that the test results do not correspond with the actual damage.

According to this invention, as described above, water containing wood extracts is distributed widely into the ground through the drain pipes, so that it is possible to lure termites from a wide area. This makes it possible to estimate the extent of damage by termites with high accuracy.

Termites lured into the luring device can be killed effectively by giving them termiticides.

For those termites that make nests in wood, such as Formosan subterranean termites, they are lured into the closed container and after they have made a nest in the wood, they can be captured and killed all at once in a very effective manner.

What is claimed is:

1. A device for luring termites comprising an open-topped container containing wood which termites attack, and at least one drainpipe connected to the bottom of said container, said at least one drainpipe being formed with holes through which termites can pass.

2. A device as claimed in claim 1 further comprising a water-permeable lid covering the top opening of said container.

3. A device as claimed in claim 2, wherein wood which the termites attack is in said at least one drainpipe.

4. A device as claimed in claim 2, wherein said container is connected to a closed container containing wood in which termites can make a nest.

5. A device as claimed in claim 1 further comprising a water-tight lid covering the top opening of said container.

6. A device as claimed in claim 5, wherein wood which the termites attack is in said at least one drainpipe.

7. A device as claimed in claim 5, wherein said container is connected to a closed container containing wood in which termites can make a nest.

8. A device as claimed in claim 1 further comprising a water-permeable dish member covering the top opening of said container with its concave side facing upward.

9. A device as claimed in claim 8, wherein wood which the termites attack is in said at least one drainpipe.

10. A device as claimed in claim 8, wherein said container is connected to a closed container containing wood in which termites can make a nest.

11. A device as claimed in claim 1 wherein wood which the termites attack is in said at least one drainpipe.

12. A device as claimed in claim 11, wherein said container is connected to a closed container containing wood in which termites can make a nest.

13. A device as claimed in claim 1 wherein said container is connected to a closed container containing wood in which termites can make a nest.

14. A device as claimed in claim 1, wherein said at least one drainpipe is inserted through holes formed in a side wall of the container.

15. A device as claimed in claim 14, wherein the container is a truncated conical plastic container with a water-tight lid.

16. A device comprising a plurality of the devices as claimed in claim 1 which are connected together by the at least one drainpipe.

17. A device as claimed in claim 16, wherein at least one joint is used for connecting the devices together with the at least one drainpipe.

18. A method for luring termites comprising:
  burying in the ground a drainpipe section of a device comprising:
    an open-topped container containing wood which termites attack, and at least one drainpipe connected to the bottom of said container, said at least one drainpipe being formed with holes through which termites can pass;
  and supplying water so as to be brought into contact with the wood in said container and permeate into the ground through said holes formed in said at least one drainpipe, thereby luring termites.

19. A method for killing termites comprising:
  burying in the ground a drainpipe section of a device comprising:
    an open-topped container containing wood which termites attack, and at least one drainpipe connected to the bottom of said container, said at least one drainpipe being formed with holes through which termites can pass;
  supplying water so as to be brought into contact with the wood in said container and permeate into the ground through said holes formed in said at least one drainpipe, and
  applying a termiticide to termites lured into said container.

20. A method for killing termites as claimed in claim 19 wherein said termiticide is formulated in a poisonous bait.

21. A method for capturing termites comprising:
  burying in the ground a drainpipe section of a device comprising:
    an open-topped container containing wood which termites attack, and at least one drainpipe connected to the bottom of said container, said at least one drainpipe being formed with holes through which termites can pass;
  supplying water so as to be brought into contact with the wood in said container and permeate into the ground through said holes formed in said at least one drainpipe to lure termites into said container,
  connecting to said container a closed container containing wood in which termites can make a nest, and capturing termites in said closed container after the termites in said closed container have made a nest.

22. A method for luring termites comprising:
  burying in the ground a drainpipe section of a device comprising:
    an open-topped container containing wood which termites attack, and at least one drainpipe connected to the bottom of said container, said at least one drainpipe being formed with holes through which termites can pass;
  and supplying water so as to be brought into contact with the wood in said container.

23. A method for killing termites comprising:
  burying in the ground a drainpipe section of a device comprising:
    an open-topped container containing wood which termites attack, and at least one drainpipe connected to the bottom of said container, said at least one drainpipe being formed with holes through which termites can pass;
  supplying water so as to be brought into contact with the wood in said container, and applying a termiticide to termites lured into said container.

24. A method for capturing termites comprising:
  burying in the ground a drainpipe section of a device comprising:
    an open-topped container containing wood which termites attack, and at least one drainpipe connected to the bottom of said container, said at least one drainpipe being formed with holes through which termites can pass wherein said container is connected to a closed container containing wood in which termites can make a nest;
  supplying water so as to be brought into contact with the wood in said container, and capturing termites in said closed container after the termites in said closed container have made a nest.

25. A device for luring termites comprising at least two open-topped containers each containing wood which termites attack, and a drainpipe connecting the bottoms of said at least two containers, said drainpipe being formed with holes through which termites can pass.

26. A device as claimed in claim 25 further comprising a water-permeable lid covering the top openings of said at least two containers.

27. A device as claimed in claim 25 further comprising a water-tight lid covering the top openings of said at least two containers.

28. A device as claimed in claim 25 further comprising a water-permeable dish member covering the top openings of said at least two containers with its concave side facing upwards.

29. A device as claimed in claim 25 wherein wood which the termites attack is in said drainpipe.

30. A device as claimed in claim 25 wherein at least one of said at least two open-topped containers is connected to a closed container containing wood in which termites can make a nest.

31. A method for luring termites comprising:

burying in the ground a drainpipe section of a device comprising:

at least two open-topped containers each containing wood which termites attack, and a drainpipe connecting the bottom of said containers, said drainpipe being formed with holes through which termites can pass; and supplying water so as to be brought into contact with the wood in said at least two containers and permeate into the ground through said holes formed in said drainpipe, thereby luring termites.

32. A method for luring termites comprising:

burying in the ground a drainpipe section of a device comprising:

at least two open-topped containers each containing wood which termites attack, and a drainpipe connecting the bottom of said at least two containers, said drainpipe being formed with holes through which termites can pass; and supplying water so as to be brought into contact with the wood in said at least two containers.

33. A method selected from the group consisting of luring termites, capturing termites, killing termites or combinations thereof, with a plurality of devices connected together with a drainpipe, wherein each device comprises:

an open-topped container containing wood which termites attack, and said drainpipe connected to the bottom of said container, said drainpipe being formed with holes through which termites can pass.

* * * * *